United States Patent [19]

Ross

[11] Patent Number: 5,557,493

[45] Date of Patent: Sep. 17, 1996

[54] METHOD OF ADJUSTING LINEARITY

[75] Inventor: Mike Ross, Granger, Ind.

[73] Assignee: CTS Corporation, Elkhart, Ind.

[21] Appl. No.: 223,474

[22] Filed: Apr. 5, 1994

[51] Int. Cl.$^6$ ................................................ H01F 13/00
[52] U.S. Cl. ........................ 361/149; 361/267; 361/148; 307/101
[58] Field of Search ............................ 361/140, 143, 361/146, 147, 148, 150, 149, 151, 267; 307/101

[56] References Cited

U.S. PATENT DOCUMENTS

| | | | |
|---|---|---|---|
| 3,596,144 | 7/1971 | Cunningham | 361/147 X |
| 3,609,611 | 9/1971 | Parnell | 335/284 |
| 3,708,727 | 1/1973 | Wielebski et al. | 335/284 X |
| 4,074,197 | 2/1978 | Bader | 361/146 X |
| 4,104,591 | 8/1978 | Reüting | 361/147 X |
| 4,354,218 | 10/1982 | Steingrover et al. | 361/147 |
| 4,782,293 | 11/1988 | Steingroever et al. | 361/147 X |
| 4,873,605 | 10/1989 | Drits et al. | 361/143 |
| 5,053,893 | 10/1991 | Hayata et al. | 361/149 X |

OTHER PUBLICATIONS

"Permanent Magnet Guidelines", Magnet Materials Producers Association, Dec., 1987, pp. 18–24.

Primary Examiner—Fritz M. Fleming
Attorney, Agent, or Firm—Jones, Day, Reavis & Pogue

[57] ABSTRACT

A linear permanent magnet position sensor is produced by a novel permanent magnet demagnetization process. Demagnetization field strength is controlled to demagnetize a thinner portion of the permanent magnet less than, equally, or greater than a thicker portion of the same permanent magnet. Linearity and stability are both tailored through a single demagnetization step.

3 Claims, 5 Drawing Sheets

METHOD OF ADJUSTING LINEARITY

BACKGROUND OF THE INVENTION

1. Field of the Invention

This invention pertains to magnetic field sensors generally, and particularly to methods for adjusting sensor linearity while simultaneously stabilizing permanent magnet output.

2. Description of the Related Art

There are a variety of known techniques for position sensing. Optical, electrical, electrostatic and magnetic fields are all used with apparatus to measure position. A few of the known apparatus are resistive contacting sensors, inductively coupled ratio detectors, variable reluctance devices, capacitively coupled ratio detectors, optical detectors using the Faraday effect, photo-activated ratio detectors, radio wave directional comparators, and electrostatic ratio detectors. There are many other known detectors, too numerous to mention herein.

These sensors each offer much value for one or more applications, but none meet all application requirements for all sensing applications. The limitations may be due to cost, sensitivity to particular energies and fields, resistance to contamination and environment, stability, ruggedness, linearity, precision, or other similar factors.

Sensing applications can be very demanding. The sensor may be immersed in or sprayed by contaminants. This may occur at all temperature extremes with the sensor operational in heated compartments or in near absolute zero scientific exploration.

The combination of temperature extremes and contamination causes industry to explore very rugged and durable components. One particular group of sensors, those which utilize magnetic energy, are rapidly being accepted into demanding applications. This is because of the inherent insensitivity of the magnetic system to contamination, together with great durability characteristic of the components.

Applying magnetic sensing to ferromagnetic tone wheels has been a relatively easy task. The impulse provided by the tone wheel is readily detected through all conditions, with very simple electronic circuitry. Due to the digital nature of the output, no linearity is required of a tone wheel or similar digital proximity system.

Linear analog magnetic sensors, particularly those using Hall effect IC detectors, are also being pursued. Industry believes these sensors will offer advantages over more widely used existing technologies. Magnetic circuits offer admirable performance upon exposure to commonplace moisture and dirt contaminants. However, prior to the present invention, none of the magnetic sensors were able to offer the necessary combination of low cost, reliability, and precision output.

Magnetic sensors are not currently used in applications where there is a need for linearity and precise output. Deviations in linearity of less than one percent from sensor output compared to actual may have very adverse affect on perceived quality and even on related electronic control functions. While many sensors are specified for extremely tight tolerances, magnetic sensing has previously not met these requirements.

Typical magnetic circuits use one or a combination of magnets to generate a field across an air gap. The magnetic sensor, be this a Hall effect device or a magnetoresistive material or some other magnetic field sensor, is then inserted into the gap. The sensor is aligned centrally within the cross-section of the gap. Magnetic field lines are not constrained anywhere within the gap, but tend to be most dense and of consistent strength centrally within the gap. Various means may be provided to vary the strength of the field monitored by the sensor, ranging from shunting the magnetic field around the gap to changing the dimensions of the gap.

Regardless of the arrangement and method for changing the field about the sensor, the magnetic circuit must be precise in spite of fluctuating temperatures. In order to gain useful output, a permanent magnet must be completely saturated. Failure to do so will result in unpredictable performance. However, complete saturation leads to another problem referred to in the trade as irreversible loss. Temperature cycling, particularly to elevated temperatures, permanently decreases the magnetic output.

A magnet also undergoes aging processes not unlike those of other materials, including oxidation and other forms of corrosion. This is commonly referred to as structural loss. Structural and irreversible loss must be understood and dealt with in order to provide a reliable magnetic sensor with precision output.

Prior art magnetic sensors are illustrated, for example, by Tomczak et al in U.S. Pat. No. 4,570,118. Therein, a number of different embodiments are illustrated for forming the magnetic circuit of a Hall effect position sensor. The Tomczak et al disclosure teaches the use of a sintered samarium cobalt magnet material which is either flat, arcuate, and slightly off-axis, or in second and third embodiments, rectangular with shaped pole pieces. The last embodiment is most relevant to the present invention, where there are two shaped magnets of opposite polarity across an air gap of varying length.

No discussion is provided by Tomczak et al for how each magnet is magnetically coupled to the other, though from the disclosure it appears to be through the use of an air gap formed by a plastic molded carrier. Furthermore, no discussion is provided as to how this magnetic material is shaped and how the irreversible and structural losses will be managed. Sintered samarium cobalt is difficult to shape with any degree of precision, and the material is typically ground after sintering. The grinding process is difficult, expensive and imprecise. The device may be designed through shaping to be linear and precise at a given temperature and a given level of magnetic saturation, presumably fully saturated. However, such a device would not be capable of performing in a linear and precise manner, nor be reliable, through the temperature cycling realized in many environments. This is, as noted, because of the irreversible and structural losses.

Ratajski et al in U.S. Pat. No. 3,112,464, Wu in U.S. Pat. No. 5,159,268, and Allots in U.S. Pat. No. 5,164,668 illustrate several embodiments of brushless Hall effect potentiometers. However, as in Tomczak, there is no provision for temperature stabilization nor improving the linearity in a non-intrusive manner.

SUMMARY OF THE INVENTION

According to the present invention, demagnetization field strength is controlled to demagnetize a thinner portion of a permanent magnet less than, equally, or greater than a thicker portion of the same permanent magnet. Linearity and stability are both tailored through a single demagnetization process. In further steps, the appropriate demagnetization strength may be determined through the sequential saturation and demagnetization of the magnetic structure at varying demagnetization field strengths.

DESCRIPTION OF THE PREFERRED EMBODIMENT

Figure 1:
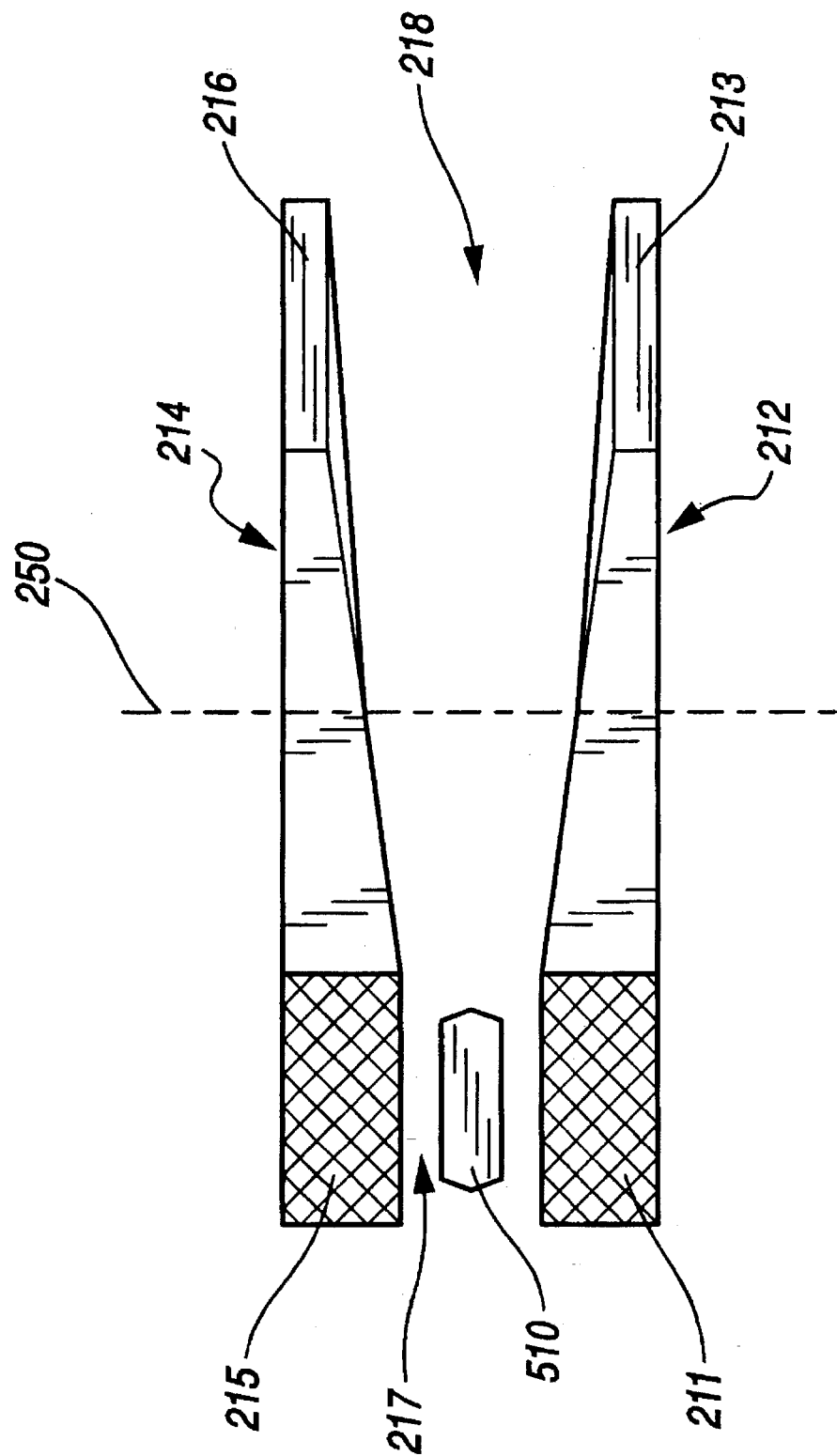
FIG. 1 illustrates a schematic view of a magnet and Hall effect device structure to which the present inventive method may be applied.

FIG. 1 illustrates schematically magnets 212 and 214 together with Hall effect device 510. The magnets 212 and 214 are shaped generally helically so as to have a relatively thicker end 211, 215 and a relatively thinner end 213, 216. The magnets are designed so as to rotate about rotary axis 250 and remain at a fixed radius therefrom. Those of ordinary skill in the art will observe that while a rotary structure is illustrated as the preferred embodiment, linear or other devices would also be applicable to the method of the present invention.

At the thicker ends 211 and 215, which is at the same angle of rotation for both magnets 212 and 214, there is a smaller air gap 217. At the thinner ends 213 and 216, there is a correspondingly larger air gap 218. The result is the generation of less magnetic induction across gap 218, with more magnetic induction across gap 217.

Rotation of magnets 212 and 214 about axis 250 results in changing field magnetic induction which is directly measured by Hall effect device 510. Proper shaping of the gap will produce a linear output from Hall effect device 510. However, such a system will not perform linearly and with precision and resistance to bearing play over life without further design considerations.

In order to stabilize a magnet against irreversible losses, it is necessary first to saturate the magnet and then to demagnetize by a small amount. The magnetic structure 450 of FIGS. 2–4 does not demagnetize evenly from magnet ends 211 and 215 to magnet ends 213 and 216, without special consideration. Absent appropriate demagnetization, the resulting device will either lose precision as a result of temperature excursions or will lose linearity as a result of stabilizing demagnetization.

Figure 2:
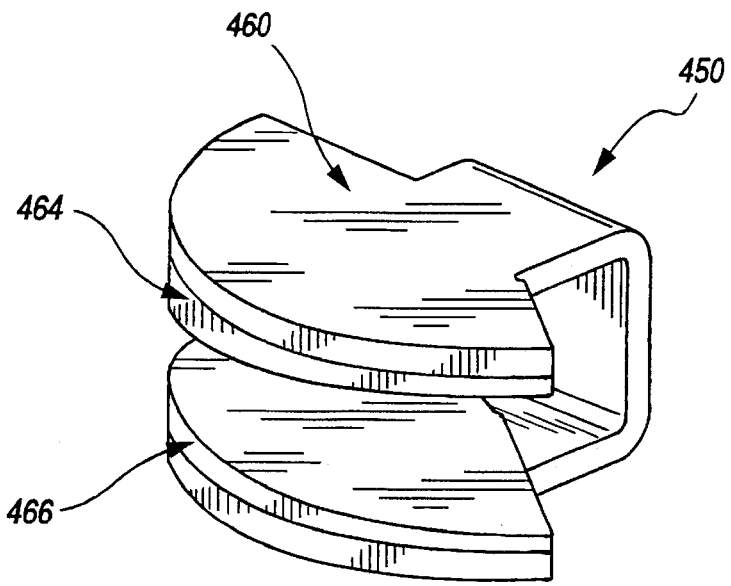
FIG. 2 illustrates an actual embodiment of the schematic magnetic structure shown in FIG. 1 from a projected view.
Figure 3:
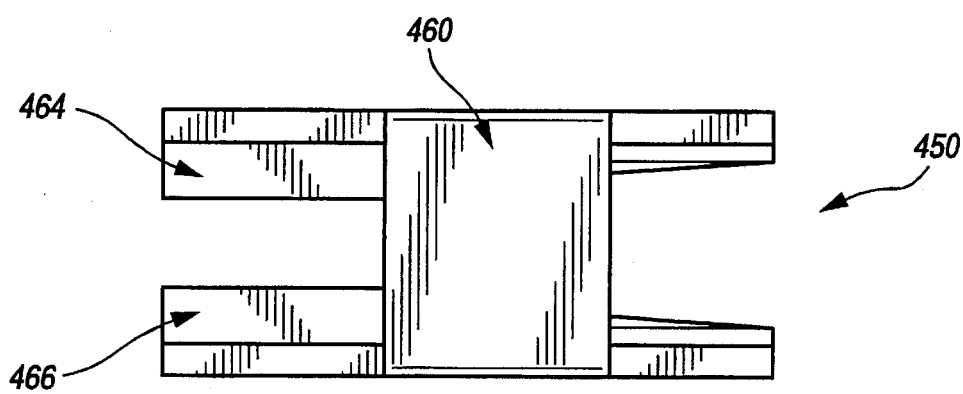
FIG. 3 illustrates the structure of FIG. 2 from an end view.
Figure 4:
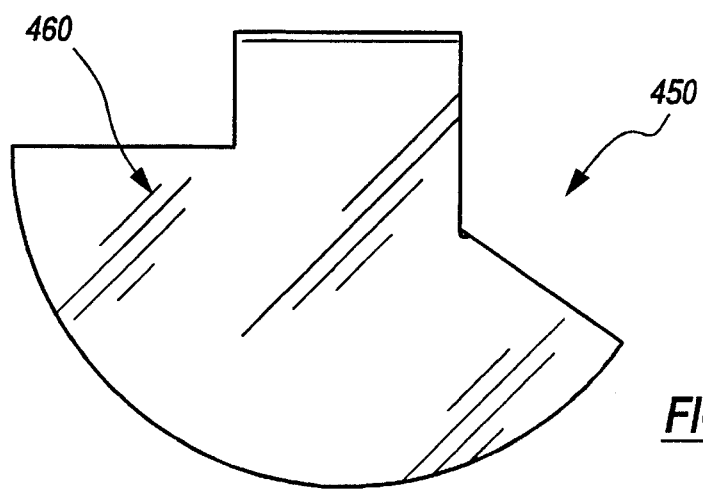
FIG. 4 illustrates the embodiment of FIG. 2 from a top view.

FIGS. 2, 3 and 4 illustrate a magnet structure 450 which is an actual embodiment of schematically illustrated magnets 212 and 214 of FIG. 1. Therein, magnet structure 450 includes a magnetically permeable pole piece 460 and two shaped magnets 464 and 466. Magnets 464 and 466 correspond directly with magnets 212 and 214 of FIG. 1.

However, an additional pole piece structure 460 not shown in FIG. 1 serves to act as a low reluctance flux path between the two magnets. The advantages of this type of magnetic structure are enumerated in the commonly assigned and co-pending patent application entitled "Internal Combustion Engine Throttle Position Sensor" filed on Mar. 4, 1994, Ser. No. 08/206,912 and incorporated entirely herein by reference.

Figure 5:
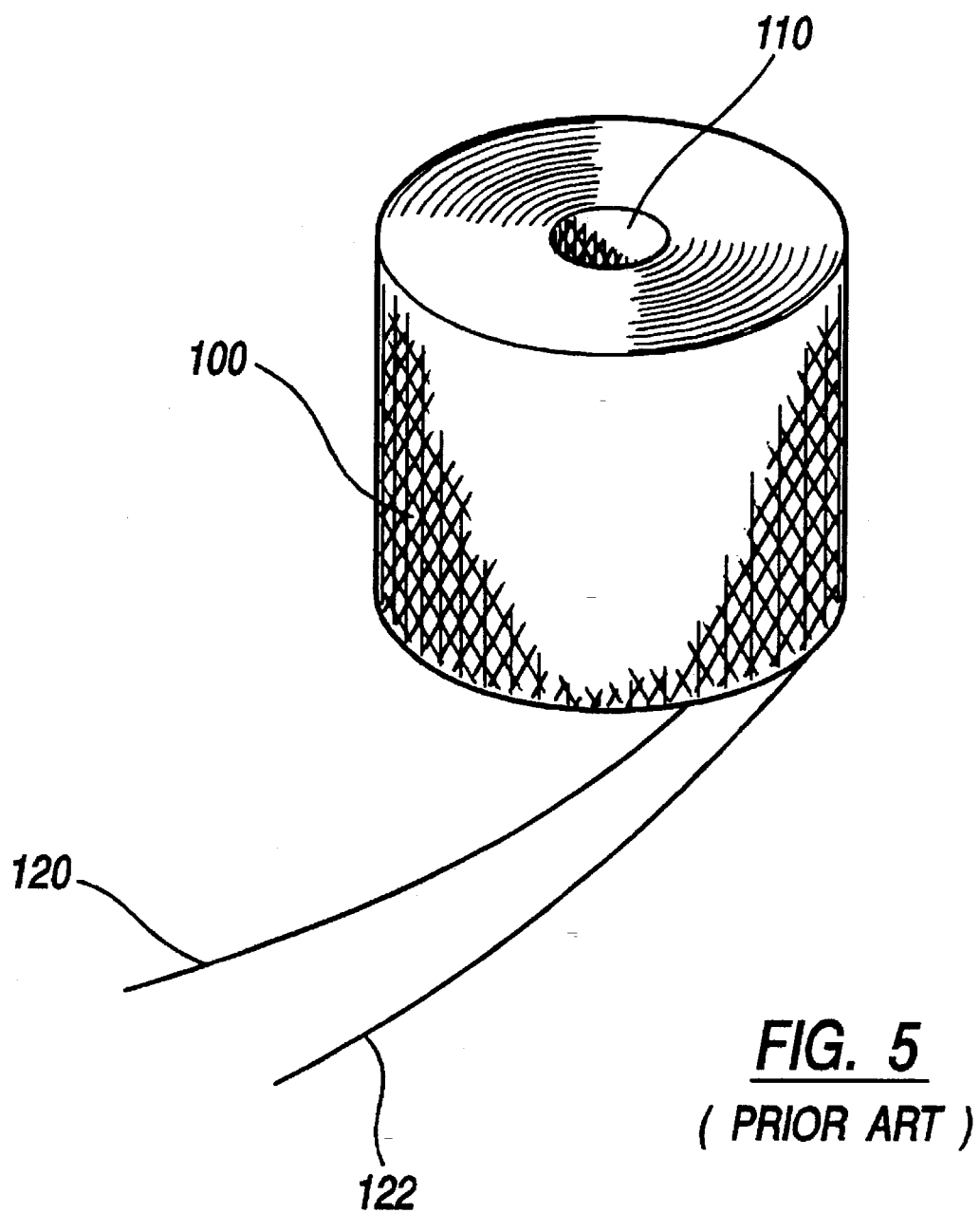
FIG. 5 illustrates a demagnetizing fixture suitable for use with the present inventive method and the magnetic structure of FIGS. 2–4.

The pole piece 460 and the varying thickness magnets 464 and 466 combine to form a very complex magnetic circuit which does not demagnetize evenly upon the application of a usual demagnetizing field. Such a field might be applied using a prior art demagnetizing coil such as coil 100 of FIG. 5. Coil 100 comprises many turns of wire about a bobbin, leaving an open core 110. Within the open core 110 a very strong magnetic field may be developed by applying a current from wire 120 through coil 100 and to wire 122. Parts to be demagnetized are placed within the open core 110. They may be placed at the very outer edge of core 110, or may be further down in and thereby more fully surrounded by coil 100. Those of ordinary skill will determine best placement.

The coil may preferably be energized using capacitive discharge circuitry of varying voltage. Once again, there are many other suitable prior art methods including application of direct current of constant magnitude. Capacitive discharge offers simplicity in terms of setting a voltage which will be used to induce the field, followed by rapid discharge. The magnetic field then settles, making the removal of the part error free. With a constant field, the field must somehow be de-energized prior to moving the part from the field or inconsistent results may be generated.

Figure 6:
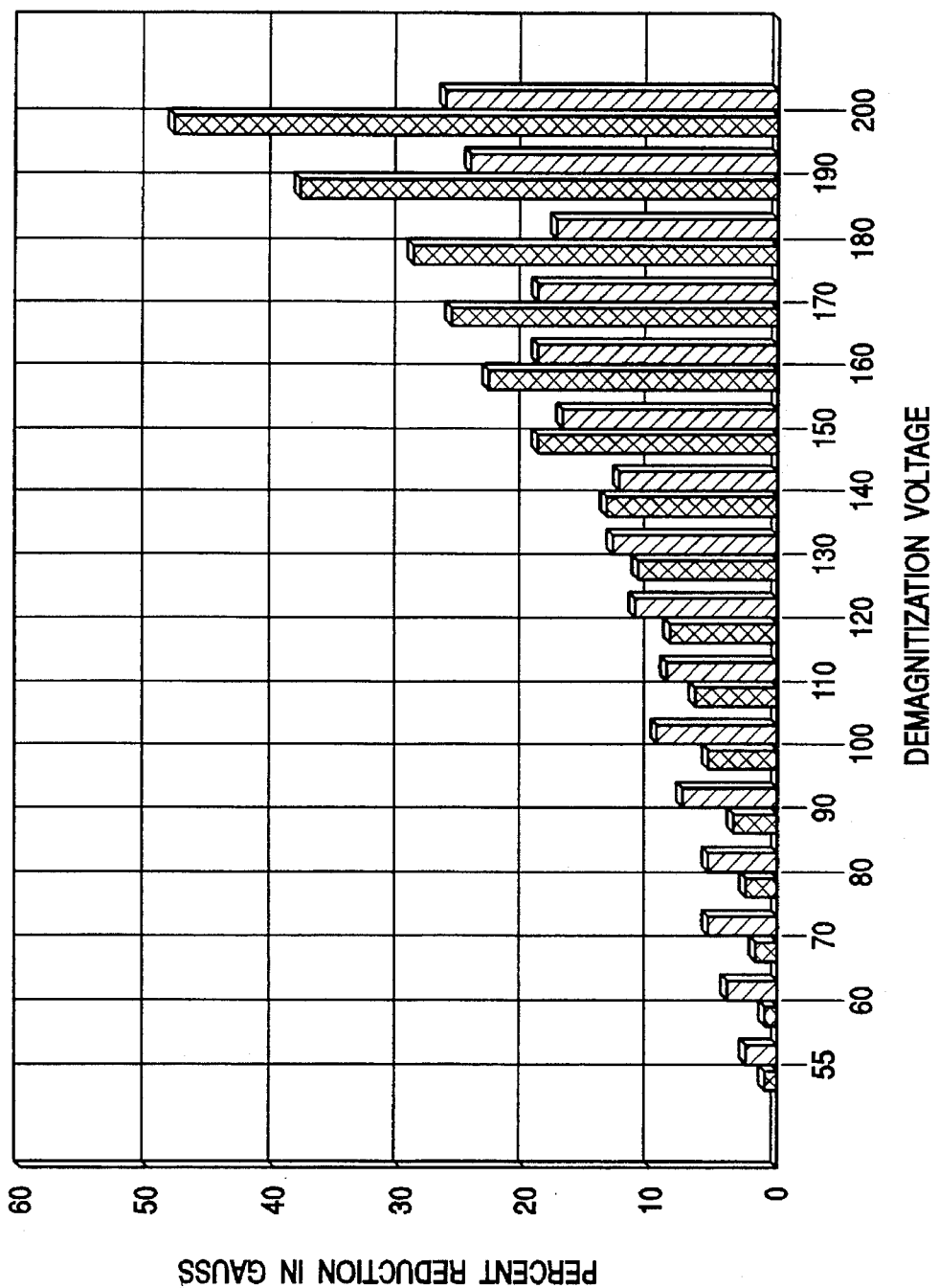
FIG. 6 illustrates a graph comparing the variation in demagnetization at the thin end of the magnet with demagnetization at the thick end of the magnet for a given applied field.

FIG. 6 compares demagnetization variability for the magnet structure of FIGS. 1–4. The high end legend corresponds to magnet thicker ends 211 and 215. The low end legend corresponds to magnet thinner ends 213 and 216. From FIG. 6 it is apparent that the high end varies on a percent basis with changes in applied voltage more than the low end. From the figure, the percent demagnetization which is the same for both the high and low ends occurs at about 135 applied volts. At lower applied voltages, the thin end demagnetizes more on a percentage basis, while at higher applied voltages, the thicker ends demagnetize more.

Since, as noted above, demagnetization is essential for stabilizing the magnetic circuit against structural and irreversible losses, the magnetic circuit must also be demagnetized in such a way that the resulting magnetic output is linear. In the preferred embodiment, magnetic output was measured with a rotary sensing structure as illustrated in the incorporated application entitled "Internal Combustion Engine Throttle Position Sensor." The deviation from linear for various levels of demagnetization voltage are illustrated in FIG. 7.

Most unexpectedly, the output was observed to be progressively more linear for the sloping magnet structure as the demagnetization voltage was progressively increased. While percent demagnetization was even at about 135 volts, the resulting output between 10 and 95 degrees of rotation was much more linear for a linear sloping magnet combination as the voltage was increased to 175 volts. Merely selecting an even demagnetization did not, in fact, provide the results attainable with more powerful demagnetization.

Figure 7:
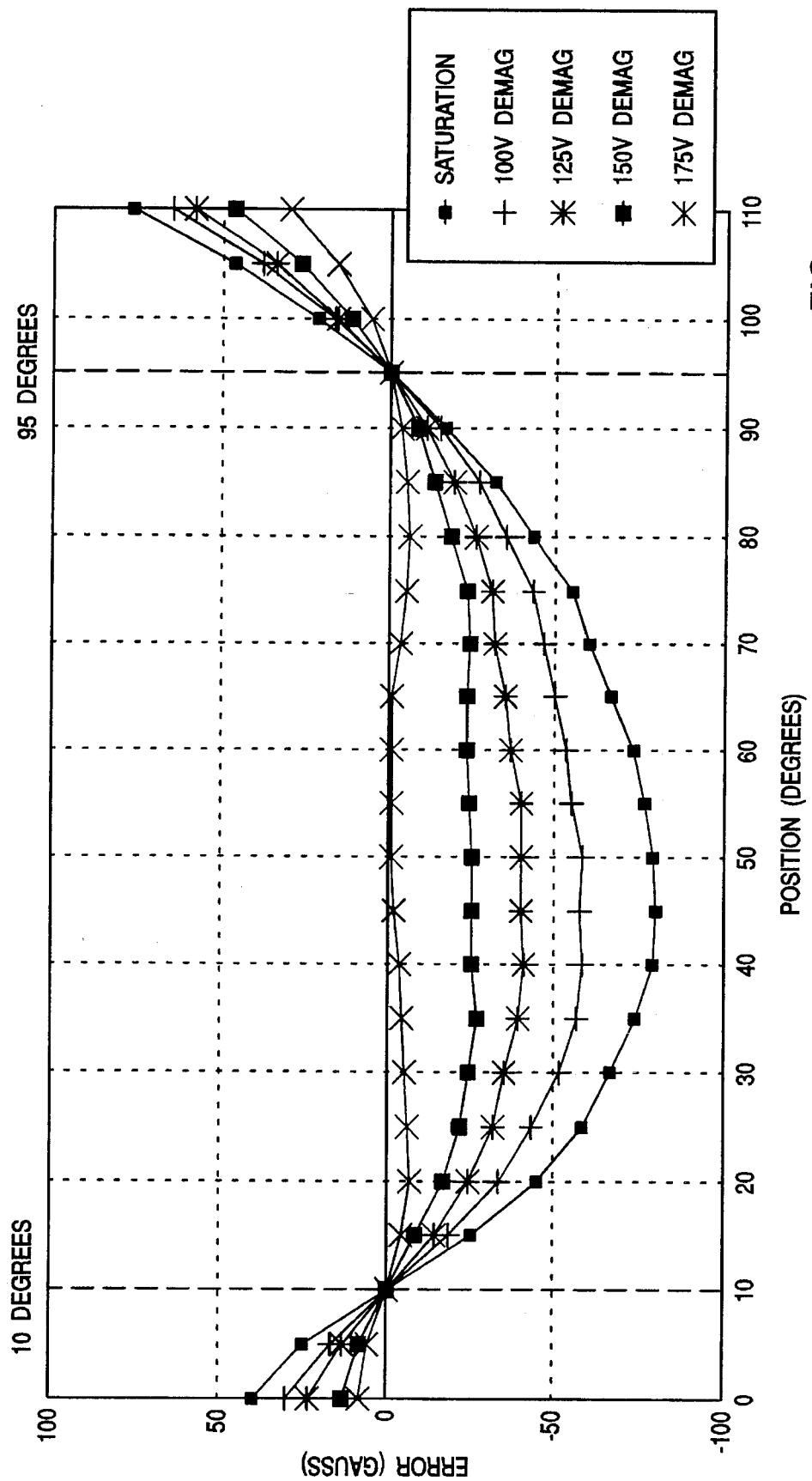
FIG. 7 illustrates the effect of varying applied demagnetization fields on resultant linearity deviation.

While the results from FIG. 7 illustrate the capability to demagnetize for both stability and linearity, those of ordinary skill in the art will recognize the limitations inherent in the system. Typical magnets are environmentally stable between about 75 percent and 97 percent of full saturation field strength. These limitations, which will vary somewhat depending upon magnetic materials, geometries, and product requirements, should not be exceeded. By first saturating a magnetic structure, then applying a demagnetizing field, and measuring resultant linearity of output and then repeating for other strengths of demagnetizing fields, the best curve fit for a given magnetic structure may be ascertained.

While the foregoing details what is felt to be the preferred embodiment of the invention, no material limitations to the scope of the claimed invention is intended. Further, features and design alternatives that would be obvious to one of ordinary skill in the art are considered to be incorporated herein. One example which would be obvious after the teachings provided herein is the shaping of the magnet geometries and associated air gaps to further improve the linearity of output for a given level of demagnetization field. The scope of the invention is set forth and particularly described in the claims hereinbelow.

I claim:

1. A method for demagnetizing a magnetic field position sensor having a first permanent magnet, said first permanent magnet having a thicker magnet portion, said thicker magnet portion having a first air gap associated therewith through which magnetic flux generated by said thicker magnet portion will travel, said first permanent magnet having a thinner magnet portion, said thinner magnet portion having a second air gap associated therewith through which flux generated by said thinner magnet portion will travel, said thicker magnet being thicker than said thinner magnet and thereby generating a stronger magnetic field, said position sensor generating an output corresponding to sensed position, said output non-linear with respect to linear variation in said sensed position, comprising the steps of:

applying a first magnetically saturating field to said first permanent magnet;

applying a first demagnetizing field to first permanent magnet and thereby demagnetizing said thicker magnet portion by a first percentage sufficient to stabilize said thicker magnet portion against irreversible and structural losses; and demagnetizing said thinner magnet portion by a second percentage sufficient to stabilize said thinner magnet portion against irreversible and structural losses, whereby said first percentage and said second percentage are not equal and said non-linear output is linearized to correspond more closely to said linear variation in said sensed position.

2. The demagnetizing method of claim 1 wherein said first demagnetizing field simultaneously demagnetizes said thicker magnet portion and said thinner magnet portion by said first and said second percentages.

3. A method for demagnetizing a magnetic field position sensor having a first permanent magnet, said first permanent magnet having a thicker magnet portion, said thicker magnet portion having a first air gap associated therewith through which magnetic flux generated by said thicker magnet portion will travel, said first permanent magnet having a thinner magnet portion, said thinner magnet portion having a second air gap associated therewith through which flux generated by said thinner magnet portion will travel, said thicker magnet being thicker than said thinner magnet and thereby generating a stronger magnetic field, said position sensor generating an output corresponding to sensed position, said output non-linear with respect to linear variation in said sensed position, comprising the steps of:

applying a test demagnetization field;

measuring the linearity of said non-linear output;

re-saturating said first magnet;

determining a first demagnetizing field strength;

applying a first magnetically saturating field to said first permanent magnet;

applying a first demagnetizing field to first permanent magnet and thereby demagnetizing said thicker magnet portion by a first percentage sufficient to stabilize said thicker magnet portion against irreversible and structural losses; and demagnetizing said thinner magnet portion by a second percentage sufficient to stabilize said thinner magnet portion against irreversible and structural losses, whereby said first percentage and said second percentage are not equal and said non-linear output is linearized to correspond more closely to said linear variation in said sensed position.

* * * * *